US012709711B2

(12) United States Patent
White et al.

(10) Patent No.: US 12,709,711 B2
(45) **Date of Patent: *Aug. 18, 2026**

(54) LIQUID CRYSTAL ELASTOMER COMPOSITIONS AND METHODS OF MAKING THE SAME

(71) Applicant: The Regents of the University of Colorado, a body corporate, Denver, CO (US)

(72) Inventors: Timothy White, Longmont, CO (US); Tayler Hebner, Longmont, CO (US); Joselle Mccracken, Westminster, CO (US); Brian Donovan, Redwood City, CA (US); Christopher Bowman, Boulder, CO (US); Grant Bauman, Boulder, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/201,726

(22) Filed: May 7, 2025

(65) Prior Publication Data

US 2025/0270447 A1 Aug. 28, 2025

Related U.S. Application Data

(63) Continuation of application No. 18/166,389, filed on Feb. 8, 2023, now Pat. No. 12,319,861.

(60) Provisional application No. 63/307,951, filed on Feb. 8, 2022, provisional application No. 63/307,946, filed on Feb. 8, 2022.

(51) Int. Cl.

| | |
|---|---|
| ***G02F 1/1333*** | (2006.01) |
| ***C09K 19/38*** | (2006.01) |

(52) U.S. Cl.
CPC ................................ *C09K 19/3809* (2013.01)

(58) Field of Classification Search
CPC ........ C09K 19/3804; C09K 2019/0448; G02F 1/1333
See application file for complete search history.

(56) References Cited

U.S. PATENT DOCUMENTS

| | | | | |
|---|---|---|---|---|
| 12,319,861 | B2 * | 6/2025 | White .................... | C09K 19/04 |
| 2001/0017676 | A1 | 8/2001 | Arakawa et al. | |
| 2025/0270447 | A1 * | 8/2025 | White .................... | C09K 19/04 |

OTHER PUBLICATIONS

Schlafmann et al., "Tunable and Switchable Thermochromism in Cholesteric Liquid Crystalline Elastomers", Apr. 26, 2024, ACS Appl. Mater. Interfaces, vol. 16, pp. 23780-23787. (Year: 2024).*

Kurihara, et al., "Light scattering behavior of (polymer/low molecular weight liquid crystal) composite films with uniaxial alignment under electrical and optical drive", Polymer Journal, vol. 56, No. 4, pp. 247-253 (1999).

* cited by examiner

*Primary Examiner* — Geraldina Visconti
(74) *Attorney, Agent, or Firm* — HOLZER PATEL DRENNAN

(57) ABSTRACT

Described herein are various embodiments for liquid crystal elastomers (LCE) formed from liquid crystalline monomers having 4-(6-(acryloyloxy)n-oxy)phenyl-4-(6-(acryloyloxy) m-oxy)benzoate (CnBAPE) as the mesogenic core. The LCEs described herein have improved thermotropic characteristics, including lower thermotropic activation temperatures. The LCEs described herein may also incorporate azobenzene to thereby also enhance the phototropic properties of the LCE.

15 Claims, 14 Drawing Sheets

HS SH
GDMP (f.g. 2)

HS SH
BDMT (f.g. 2)

HS SH HS
TMPMP (f.g. 3)

HS SH HS SH
PETMP (f.g. 4)

LIQUID CRYSTAL ELASTOMER COMPOSITIONS AND METHODS OF MAKING THE SAME

CROSS-REFERENCE TO RELATED APPLICATIONS

This application is a continuation of U.S. patent application Ser. No. 12,319,861, filed Feb. 8, 2023, entitled LIQUID CRYSTAL ELASTOMER COMPOSITIONS AND METHODS OF MAKING THE SAME, which claims priority to U.S. Provisional Patent Application No. 63/307,946, filed Feb. 8, 2022, entitled LIQUID CRYSTALLINE ELASTOMERS WITH OPTIMIZED MESOGENIC CONSTITUENTS TO ENABLE LOW TEMPERATURE RESPONSE, and to U.S. Provisional Patent Application No. 63/307,951, filed Feb. 8, 2022, entitled ENHANCING EFFICIENCY OF PHOTOMECHANICAL WORK GENERATION IN LIQUID CRYSTAL ELASTOMERS, both each of which are is hereby incorporated by reference in their its entirety.

BACKGROUND

Liquid crystalline monomers are the precursors of polymer networks that retain liquid crystallinity. Functionally, the retention of liquid crystallinity in polymer networks assigns both optical and mechanical anisotropy that has enabled utility as, e.g., compensation films in displays, optical elements, thermal interfaces, and in health care. The properties of the polymer networks prepared by the homopolymerization (or copolymerization) of these typically difunctional liquid crystalline monomers are primarily defined by the degree of crosslinking (e.g., the molecular weight between crosslinks, $MW_c$) as well as the strength of intermolecular interaction derived from the liquid crystalline precursor(s).

Recently-developed methods for preparing liquid crystal elastomers (LCE) from liquid crystalline monomers, including aza-Michael, thiol-Michael, and chain transfer reactions, have focused exclusively on the use of classical liquid crystalline monomers based on 1,4-Bis[4-(n-acryloyloxybutyloxy)benzoyloxy]-2-methylbenzene, also referred to as CnM. Liquid crystalline monomers based on this mesogenic core are particularly appealing in the preparation of high-performance polymeric materials due to the comparatively high birefringence, thermal stability, ability to form room temperature eutectic mixtures, and chemical robustness.

However, the use of CnM as the mesogenic core of a liquid crystalline monomer in the preparation of LCE has the drawback of contributing to a LCE having a relatively high thermotropic character. The thermotropic character of liquid crystalline materials are defined by intermolecular interactions and often based on π-π interaction of benzene rings in molecular pairs. In the case of mesogens based on 1,4-Bis[4-(n-acryloyloxybutyloxy)benzoyloxy]-2-methylbenzene and molecular relatives, the three benzyl rings of the mesogenic segments produce strong intermolecular forces within these molecules. Accordingly, it is hypothesized that the energy required to disrupt the intermolecular interaction of these materials is nonoptimal in LCE compositions based on this mesogen. For example, previous studies have shown that the thermotropic activation temperature for LCE prepared from CnM-based monomers is in the range of 70° C. or greater.

Other studies have focused on the incorporation of non-liquid crystal content into the LC monomers used in the fabrication of LCE in order to reduce the thermotropic activation temperature. While such approaches have been successful in some respects in lowering the thermotropic activation temperature of LCE, the incorporation of the non-LC content into the LCE has significant drawbacks. For example, the non-LC content may reduce the thermomechanical response of the LCE, as well as reduce the rate of thermomechanical response.

Despite extensive research in this area and a long-felt need for LCE with improved thermotropic activation characteristics that retain maximum thermomechanical response, to date no solutions have been offered. Accordingly, a need continues to exist for improved LCE materials.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a liquid crystal elastomer having improved thermotropic properties is described, the liquid crystal elastomer including a liquid crystalline monomer having a mesogenic core, wherein the mesogenic core comprises 4-(6-(acryloyloxy)n-oxy)phenyl-4-(6-(acryloyloxy)m-oxy)benzoate (CnBAPE). In some embodiments, n is one of pentyl, hexyl, heptyl, octyl, nonyl, decyl, undecyl, and m is one of pentyl, hexyl, heptyl, octyl, nonyl, decyl, undecyl. Monomers with other mesogenic cores, such as CnM, may also be incorporated into the LCE.

In some embodiments, a liquid crystal elastomer having improved thermotropic and/or phototropic properties is described, the liquid crystal elastomer including a liquid crystalline monomer having a mesogenic core and an azobenzene, wherein the mesogenic core comprises 4-(6-(acryloyloxy)n-oxy)phenyl-4-(6-(acryloyloxy)m-oxy)benzoate (CnBAPE). In some embodiments, n is one of pentyl, hexyl, heptyl, octyl, nonyl, decyl, undecyl, and m is one of pentyl, hexyl, heptyl, octyl, nonyl, decyl, undecyl.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Figures 1, 2:
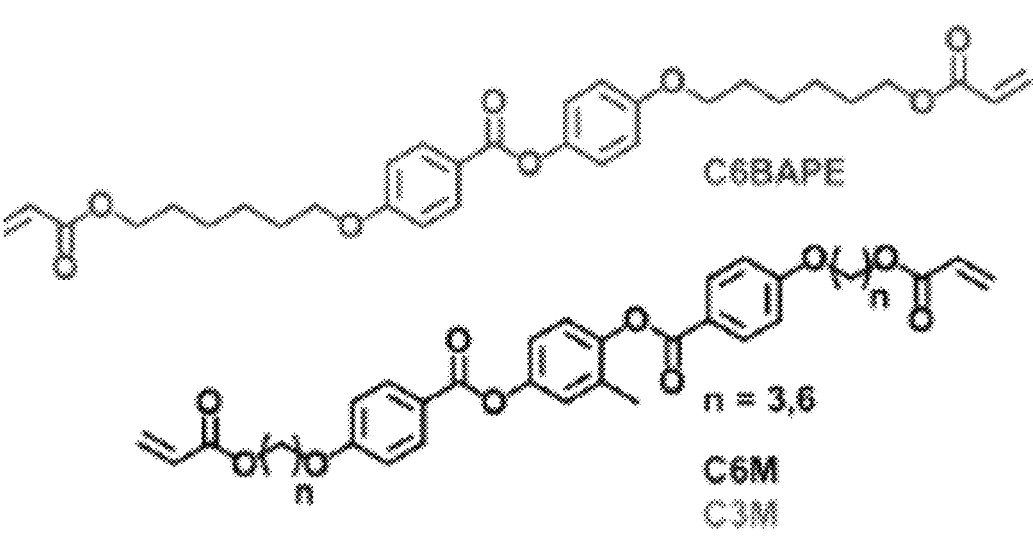
FIG. 1 is the chemical structures for various mesogenic cores suitable for use in an LCE in accordance with various embodiments described herein.
FIG. 2 is the chemical structures for various thiols suitable for use in an LCE in accordance with various embodiments described herein.

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Described herein are various embodiments for liquid crystal elastomers (LCE) formed from liquid crystalline monomers having unique mesogenic cores. The LCEs described herein have improved thermotropic characteristics, including lower thermotropic activation temperatures. In particular, the LCE described herein are prepared using liquid crystalline diacrylate monomers with reduced mesogen-mesogen interaction to thereby enhance and sharpen the thermotropic actuation of these materials. Different techniques can be used for the preparation of the LCEs described herein, but regardless of the technique used, enhanced thermotropic response is exhibited. This enhanced thermotropic response increases the thermomechanical efficiency, in some cases by as much as six-fold.

Fundamentally, liquid crystallinity is observed in molecules that i) are polar, ii) have a rigid segment, and iii) have flexible segments (one or more) that disrupt the formation of crystalline solids. Embodiments of the technology described herein focus, in some aspects, on the rigid segment of mesogens. The predominance of prior work in this area has focused almost exclusively on the use of 1,4-Bis[4-(n-acryloyloxybutyloxy)benzoyloxy]-2-methylbenzene (CnM) and molecular relatives, all of which are based on at least three benzyl groups. The thermotropic character of liquid crystalline materials are defined by intermolecular interactions and often based on IT-TT interaction of benzene rings in molecular pairs. In the case of mesogens based on 1,4-Bis[4-(n-acryloyloxybutyloxy)benzoyloxy]-2-methylbenzene and molecular relatives, the three benzyl rings of the mesogenic segments produce strong intermolecular forces within these molecules. It is hypothesized that these intermolecular forces contribute significantly to the thermotropic characteristics of the LCE formed therefrom, including generally increasing the thermotropic activation temperature. Accordingly, the energy required to disrupt the intermolecular interaction of these materials is nonoptimal in LCE compositions based on this mesogen.

In view of the above, embodiments of the technology described herein generally incorporate liquid crystalline segments into LCE based on a benzoic acid phenyl ester mesogenic core. In some embodiments, the mesogenic core of the monomer used in the formation of LCE comprises 4-(6-(acryloyloxy)n-oxy)phenyl-4-(6-(acryloyloxy)m-oxy) benzoate (CnBAPE). In some embodiments, n is one of pentyl, hexyl, heptyl, octyl, nonyl, decyl, undecyl, and m is one of pentyl, hexyl, heptyl, octyl, nonyl, decyl, undecyl. In some embodiments, n is the same as m, while in other embodiments, n is different from m.

This class of mesogenic core includes only two benzyl rings, thus significantly decreasing the energy required to induce the actuation of LCE. According to Hunter-Sanders theory, electrostatic potentials often dominate $\pi$-$\pi$ stacking interactions in aromatic molecules. These electrostatic interactions tend to form slightly offset aromatic packing from the positively charged $\sigma$-frameworks of aromatic domains that associate with adjacent negatively charged $\pi$-electron clouds. In the technology described herein, the incorporation of the CnBAPE mesogen with only two phenyl rings results in the reduction within the polymer network of the LCE of the $\pi$-$\pi$ stacking surface area and relative strength of electrostatic intermolecular interaction potential. This results in the thermotropic character of LCE prepared with this class of mesogen shifting to lower temperatures compared to materials based on, e.g., the classical mesogen in CnM.

In some embodiments, the mesogenic core of the monomer used in the LCE is 4-(6-(acryloyloxy)hexyloxy)phenyl-4-(6-(acryloyloxy)hexyloxy)benzoate (C6BAPE). The chemical structure of C6BAPE is shown in FIG. 1. C6BAPE possesses the two benzyl ring structure found to be beneficial in lowering the thermotropic actuation temperature of the LCE formed therefrom, while also exhibiting LC properties. While much of the discussion and examples provided herein focus on the use of the C6BAPE, it should be appreciated that all class of CnBAPE materials possessing the two benzyl ring structure can be used in the technology described herein. In one non-limiting examples, C8BAPE can also be used in the formation of an LCE having a lowered thermotropic actuation temperature. In some embodiments, CnBAPE is any of C5BAPE, C6BAPE, C7BAPE, C8BAPE, C9BAPE, C10BAPE or C11BAPE.

In some embodiments, the monomer component or components of the LCE include only CnBAPE as the mesogenic core. While multiple different monomers may be used in the LCE, the mesogenic core of each monomer used in the LCE is based on CnBAPE. Thus, in such embodiments, the mesogenic core content of the LCE is 100% CnBAPE. When compared to an LCE made from only monomers having CnM as the mesogenic core, the thermotropic actuation temperature is reduced. For example, an LCE having only monomers including CnBAPE as the mesogenic core may exhibit thermotropic actuation at a temperature lower than 60° C., lower than 50° C., or even lower than 40° C., while an LCE having only monomers including CnM will have not yet exhibited thermotropic actuation at 80° C. In some embodiments, LCE based on only monomers having a CnBAPE mesogenic core exhibit a thermotropic actuation temperature of about 65° C., about 59° C. about 48° C., or about 46° C., while LCE based on only monomers having a C6M mesogenic core exhibit a thermotropic actuation temperature of about 83° C., about 92° C. or about 117° C., and LCE based on only monomers having a C3M mesogenic core exhibit a thermotropic actuation temperature of about 124° C.

In other embodiments, each monomer component of the LCE may have as its mesogenic core one of two or more different mesogenic cores. However, in such embodiments, one of the two or more different mesogenic cores is CnBAPE. For example, the LCE may be formed from multiple monomers, some of which have CnBAPE as the mesogenic core, and others of which have a second mesogenic core as its mesogenic core. When a second mesogenic core is used, the second mesogenic core may have more than two aromatic rings. For example, in some embodiments, the second mesogenic core comprises CnM having three aromatic rings. The chemical structure of CnM is shown in FIG. 1. In one non-limiting example, the second mesogenic core is C6M or C3M, though the value of n in CnM can be from 3 to 11. The introduction of CnBAPE's mesogen core with CnM disrupts the packing of the CnM LC mesogens and generally reduces the $T_{NI}$.

The mesogenic content of the LCE having monomers based on one of two different mesogenic cores may have a 1:1 molar ratio of monomers having the CnBAPE mesogenic core to monomers having the second different mesogenic core. In some embodiments, the ratio of monomers having CnBAPE to monomers having a second mesogenic core is based on an acrylate weight ratio. In such embodiments, the acrylate weight ratio for CnBAPE to second mesogen is from 1:1 to 10:1. In some embodiments, the mesogenic content of the LCE is from 0.1 wt % to 99.9 wt % CnBAPE.

In still other embodiments, one of three different mesogenic cores is used in the monomers of the LCE, with one mesogenic core being CnBAPE. The second and third mesogenic core used in the monomers of the LCE can be, in some embodiments, mesogenic cores having more than two aromatic rings. In some embodiments, the second and third mesogenic core are from the same class of mesogenic core. For example, the second and third mesogenic core may be different species of CnM, such as C6M and C3M. The specific ratio amount of mesogen cores used in the LCE is generally not limited. In some embodiments, the acrylate weight ratio of CnBAPE:CnM1:CnM2 is 4.5:1:3.5. For example, the acrylate weight ratio of CnBAPE:C6M:C3M in the LCE can be 4.5:1:3.5.

As discussed in greater detail below, the methodology used in the formation of the LCE from monomers, at least some of which have CnBAPE as their mesogenic core, may include a variety of different known LCE formation processes. Depending on the formation technique used, the LCE may further include chain extenders and/or crosslinkers as part of the LCE structure. Chain extenders generally serve to form longer chains of one or more monomer components, while the crosslinkers can server to form crosslinks between different monomers or polymers of the LCE.

In some embodiments, an aza-Michael (AM) addition reaction with primary amines is used to carry out an oligomerization reaction with monomers having CnBAPE mesogenic cores to thereby form the LCE described herein. The oligomerization reaction can be completed via incorporation of latent photoinitiator, at which point the polymerization of the oligomers can be triggered with light. In another method, a thiol-Michael (TM) addition reaction is used. Similar to the AM addition reaction, this approach also uses oligomerization of liquid crystalline monomers having CnBAPE mesogenic cores to increase $MW_c$ and a secondary reaction to complete the crosslinking of the materials to prepare LCE. In still another embodiment, a single step chain transfer (CT) reaction is used in the formation of the LCE as described herein. In the CT reaction, a formulation composed of multifunctional thiol and the liquid crystalline monomer having a CnBAPE mesogenic core is subject to free radical photopolymerization to rapidly prepare LCE.

As noted above, thiol monomers are often used in the reaction chemistry for forming the LCE as described herein. Any suitable thiol monomers can be used. In some embodiments, the thiol monomer is GDMP, BDMT, TMPTMP, PETMP, or any combination thereof. The chemical structure for GDMP, BDMT, TMPTMP, PETMP is shown in FIG. 2. Depending on the reaction chemistry, these thiol monomers can be used as chain extenders, chain transfer agents, crosslinkers, or any combination thereof. In one non-limiting example where TM is used as the reaction chemistry, GDMP is used as the chain extender and PETMP is used as the crosslinker. The specific amount of thiol monomer used in the process is generally not limited. In some embodiments, the amount of thiol used is based on the amount of acrylate in the LC monomer. For example, the thiol to acylate ratio can be in the range of from 0.85:1 to 1:1 based on functional moieties per molecule.

The degree of crosslinking may also impact the thermotropic actuation temperature of the LCE described herein. As such, the selection specific crosslinkers and the amount of crosslinker used in the LCE formation can both be adjusted to further alter or fine tune the thermotropic actuation temperature.

In some embodiments, the formation of the LCE having CnBAPE mesogenic cores as described herein may be subjected to mechanical alignment, brushed surface-enforced alignment, photopatterned surface alignment, and 3D printing (i.e., rheological) approaches. The incorporation of these techniques in the preparation of LCE may enhance and sharpen thermomechanical response of the LCE that may also decrease the temporal, optical or electrical energy inputs required for actuation.

In order to provide a photomechanical response, the LCE described herein can be formed with the incorporation of an azobenzene to thereby provide an azo-LCE that can be photoactuated. As with the enhanced thermotropic effect from incorporating CnBAPE mesogens in the LCE, the incorporation of CnBAPE in the azo-LCE improves the photomechanical response of the azo-LCE. Upon irradiation, azo-LCE compositions prepared with increasing concentrations of CnBAPE exhibit more rapid photomechanical responses and greater magnitudes of strain generation. The dependence of phototropic actuation of the azo-LCE with CnBAPE concentration is also evident in the thermotropic deformation of these materials, confirming the association of stimuli, order, and response.

Azobenzene is a photoisomerizable chromophore and therefore can be incorporated in LCE to facilitate photochemical transduction of light into mechanical work. As occurs in low molar mass liquid crystals, UV light irradiation of LCE induces trans-cis isomerization of azobenzene, which reduces the order of the polymer network. Any azobenzene known to be suitable for providing photomechanical response can be used in the azo-LCE. In some embodiments, the azobenzene is 4,4'-Bis(9-(acryloyloxy) nonyloxy)azobenzene (ST04181).

The amount of azobenzene used in the azo-LCE is generally not limited, provided the azobenzene content is capable of facilitating the photomechanical response in the azo-LCE. Generally speaking, material concentration considerations for the azo-LCE focus more on the monomer component concentrations as discussed previously with respect to the thermotropic LCE. For example, preparing azo-LCE with higher concentrations of monomers having the CnBAPE mesogen generally provides azo-LCE with improved phototropic response. That being said, the azo-LCE may still contain some amount of monomer content wherein the monomer has a three-ring structure (e.g., CnM). For example, in some embodiments, the weight ratio of CnBAPE to CnM in an azo-LCE is from 1:3 to 1:1, with phototropic properties showing more improvement when the weight ratio is closer to 1:1. The use of increased concentrations of CnBAPE-based monomers ultimately shows that through modification of aromatic content in the mesogen structure, more effective photomechanical actuation is achieved.

Similar techniques to those described previously can be used in preparing azo-LCE. For example, methods for preparing azo-LCE with liquid crystalline acrylate monomers can use chain-extension reactions followed by subsequent acrylate crosslinking. In some embodiments, aza-Michael addition reaction is used to prepare acrylate-functionalized oligomeric starting materials. The azo-LCE can also be prepared by mixing primary amines, diacrylate liquid crystalline monomer(s), and a photoinitiator. The thermally-initiated aza-Michael oligomerization proceeds to completion and subsequently the acrylate end-capped oligomers are polymerized via photoinitiation. By using liquid crystalline precursors, this method is amenable to surface-enforced alignment and is subject to complex patterning to prepare voxelated LCE that are sensitive to heat or light.

The photomechanical response of azo-LCE is typically either photochemical or photothermal. Photothermal responses mirror the thermotropic actuation of these materials. Regarding the photochemical disruption of order, azobenzene in its trans form packs well with LC mesogens both in conventional liquid crystals as well as LCE matrices. Upon irradiation with a wavelength of light near the trans azobenzene absorption peak at 365 nm, azobenzene absorbs a photon and converts to a bent cis isomer. The geometric change in the azobenzene causes the order of the polymer chains in the LCE to decrease by disturbing the intermolecular interactions of mesogens in the material. As a result, the LCE shortens along the aligned axis and expands in orthogonal directions to facilitate the volume and molecular length changes associated with isomerization and phototropic influence on order. While azobenzene isomerization independently occurs on a timescale of picoseconds, photochemical responses in azo-LCE deformation can take orders of magnitude longer as dictated by the disruption of the aligned LC mesogens incorporated in the polymer network. 16 Therefore, modification of the LC components will heavily influence the nature of phototropic response in the azo-LCE.

EXAMPLES

Example 1—Thermal and Thermomechanical Response of LCE with C6BAPE

Figure 3A:
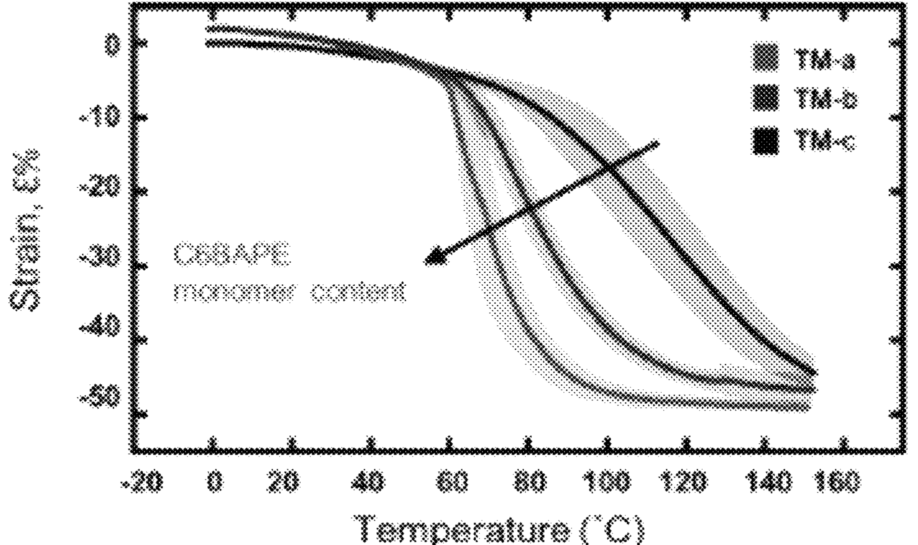
FIGS. 3A-3D are graphs summarizing experimental data regarding the thermal and thermomechanical response of LCE in accordance with various embodiments described herein.

The thermotropic actuation of TM LCE was examined using three compositions: TM-a (C6BAPE only), TM-b (a 1:1 f.g. mixture of C6BAPE:C6M) and TM-c (C6M only) As shown in FIG. 3A, LCE prepared by a TM chain extension reaction (and subject to a two-step mechanical alignment) have a considerable decrease in the temperature required to induce thermomechanical response with the introduction of C6BAPE. Notably, while all three LCE compositions achieve approximately the same overall strain value at 150° C. (37-40%), introducing C6BAPE dramatically shifts the temperature at which strain can be observed and increases the deformation rate.

Figure 3B:
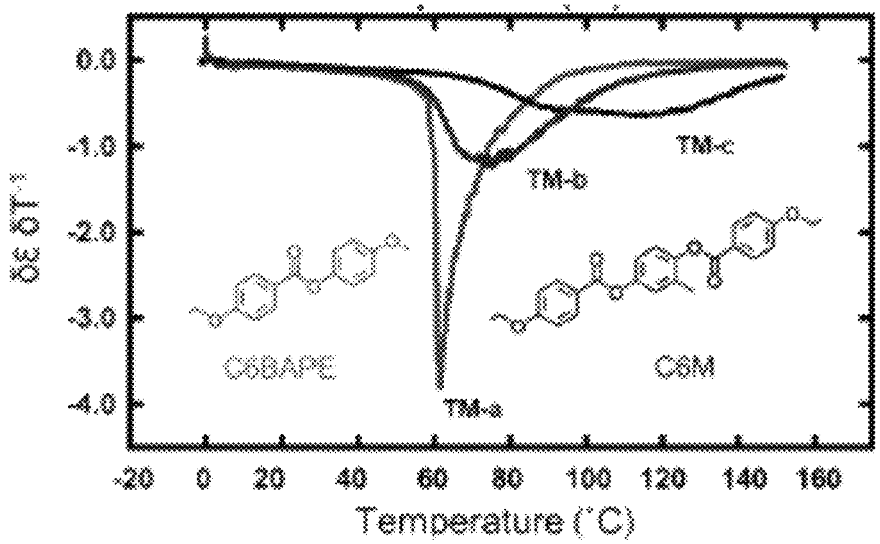
Figure 3C:
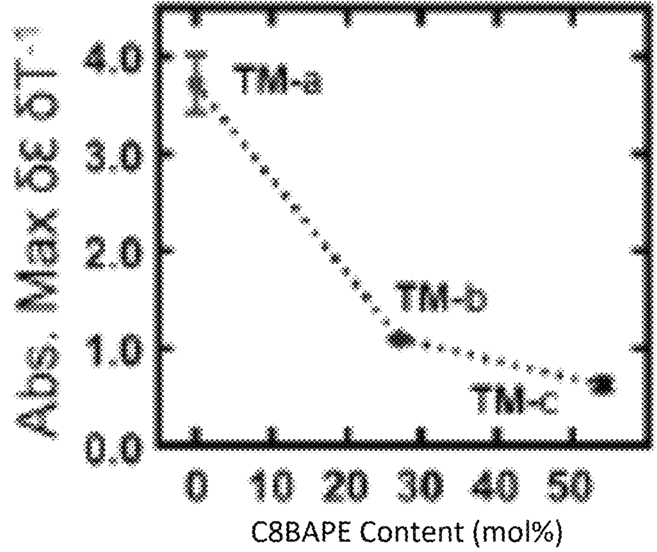
Figure 3D:
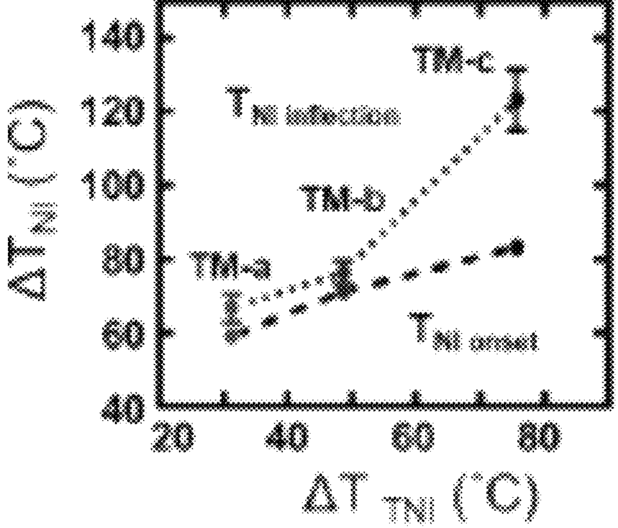

The enhancement in thermotropic actuation is isolated by taking the derivative of strain as a function of temperature as shown in FIG. 3B. C6BAPE strongly enhances the rate of strain generation with change in temperature ($\delta\varepsilon\delta T^{-1}$) in TM-a LCE. Specifically, as shown in FIG. 3C, the maximum actuation (strain) rate of TM-a LCE is 6× greater than the comparable TM-c LCE prepared from C6M. Furthermore, introducing C6BAPE into the LCE polymer network narrows the temperature window between the onset and maximum rate of deformation. As shown in FIG. 3D, TM-c LCE containing C6M have as much as a 48° C. gap between onset of strain generation and maximal strain response. In comparison, $T_{NI}$ onset of TM-a LCE (containing C6BAPE) are only 6° C. lower than the $T_{NI}$ inflection.

Example 2—Thermotropic Response of Azo-LCE

Figure 4A:
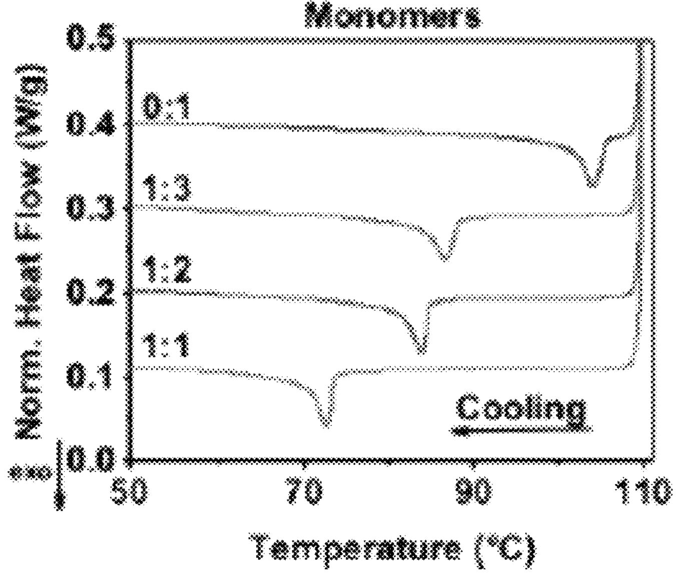
FIGS. 4A-4D are graphs summarizing experimental data regarding the thermotropic response of azo-LCE in accordance with various embodiments described herein.
Figure 4B:
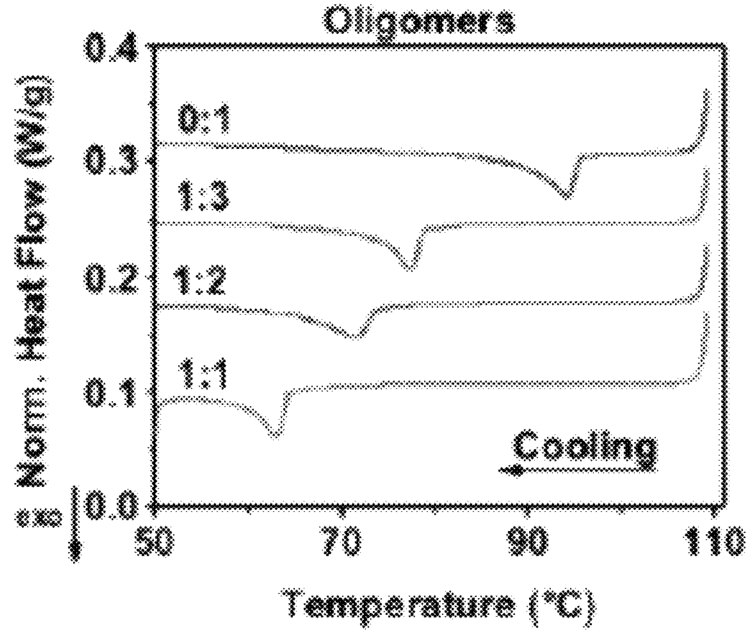

Using DSC, the thermotropic phase behavior of precursor compositions for azo-LCE having varying concentration of CnBAPE was examined. As evident by the $T_{ni}$ (exothermic peaks) in FIG. 4A, incorporating C6BAPE at varying ratios with C6M considerably affected the thermotropic properties of monomer mixtures by shifting the $T_{ni}$ to lower temperatures as C6BAPE concentration was increased. Similarly, the variation in thermotropic phase behavior of the monomer mixtures was retained upon oligomerization via aza-Michael addition as shown in FIG. 4B.

Figure 4C:
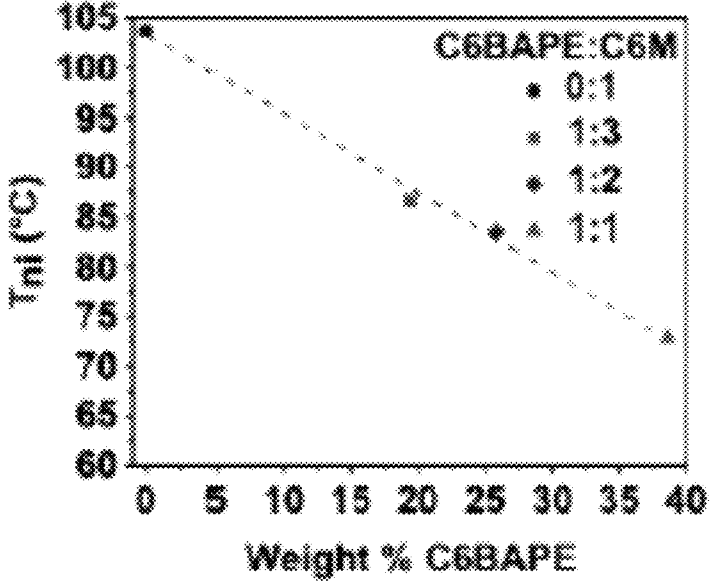
Figure 4D:
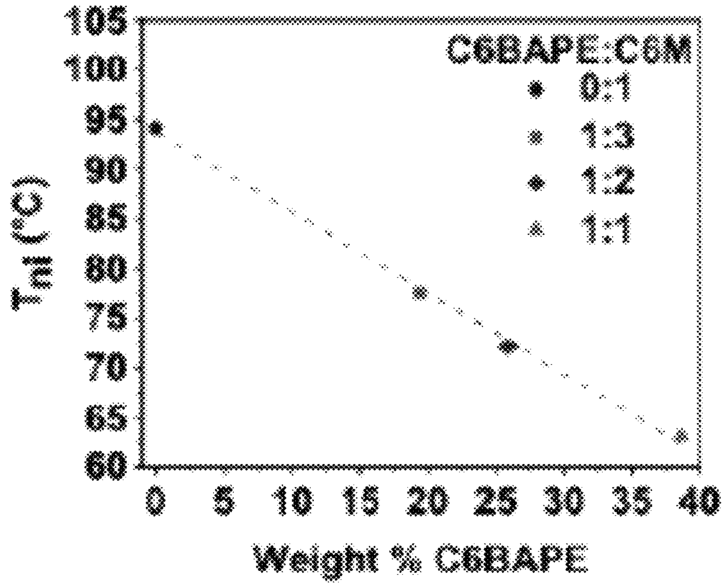

The correlations between $T_{ni}$ of the monomers/oligomers and C6BAPE concentration are summarized in FIGS. 4C and 4D. In both the monomer and oligomer mixtures, the $T_{ni}$ was reduced by nearly 30° C. when the C6BAPE concentration was increased from 0-40 wt %. As illustrated previously in FIG. 1, C6BAPE is distinctive from C6M in that it is based on a mesogenic core with two aromatic groups, rather than three. The reduction in aromatic content decreases the strength of the π-π coupling that strongly defines mesogen-mesogen interactions in the monomer melt and oligomers, leading to easier disruption of nematic ordering among mesogens and the resulting reduction in $T_{ni}$.

Example 3—Thermomechanical Response of Azo-LCE

Figure 5A:
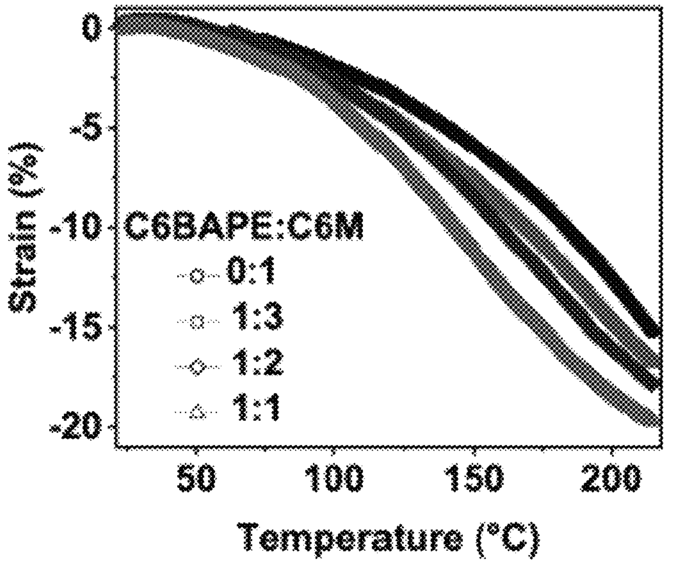
FIGS. 5A and 5B are graphs summarizing experimental data regarding the thermomechanical response of azo-LCE in accordance with various embodiments described herein.

The thermomechanical responses of azo-LCE materials were measured while held in tension (0.001 N). Strain was monitored as a function of temperature for the four azo-LCE compositions with 0:1, 1:3, 1:2, and 1:1 C6BAPE:C6M. The results are summarized in FIG. 5A. The thermomechanical response of all four azo-LCE compositions is characterized by two strain generation regimes: i) minimal strain generation at temperatures in the nematic state and ii) rapid strain generation at temperatures which order disruption is occurring. As the C6BAPE concentration was increased in the azo-LCE, the temperature at which the increased strain rate is shifted to lower temperatures. The maximum of the derivative of the strain-temperature response from each LCE is used as an indication of the $T_{ni}$ of the materials.

Figure 5B:
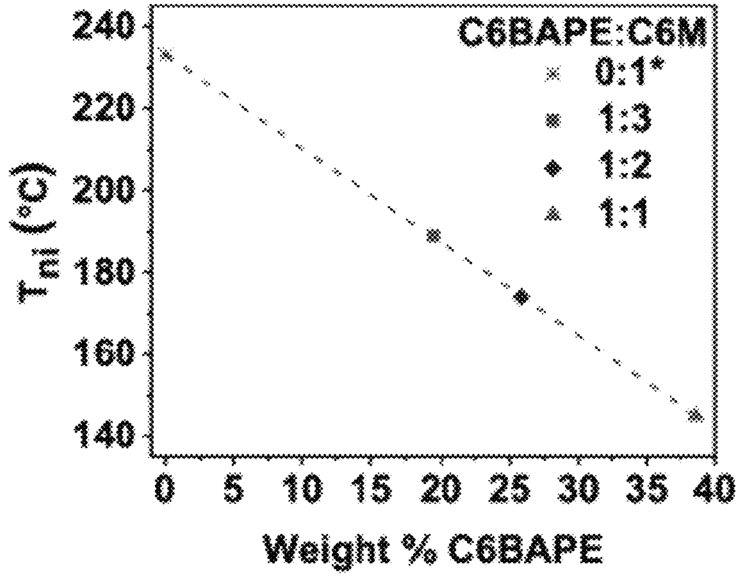

FIG. 5B plots the $T_{ni}$ of the azo-LCE as a function of C6BAPE content and shows a decrease of nearly 90° C. as C6BAPE concentration increased from 0-40 wt %. Notably, the composition based on C6M (0:1) had the highest $T_{ni}$ in the monomer/oligomer mixtures and did not reach a thermomechanical inflection point before thermal degradation. As evident in these data, the contribution of C6BAPE to mesogen-mesogen interactions seen in monomer and oligomer mixtures is retained in the polymer network and lowers the temperature of thermotropic response of the LCE.

Example 4—Photomechanical Response of Azo-LCE

Figure 6A:
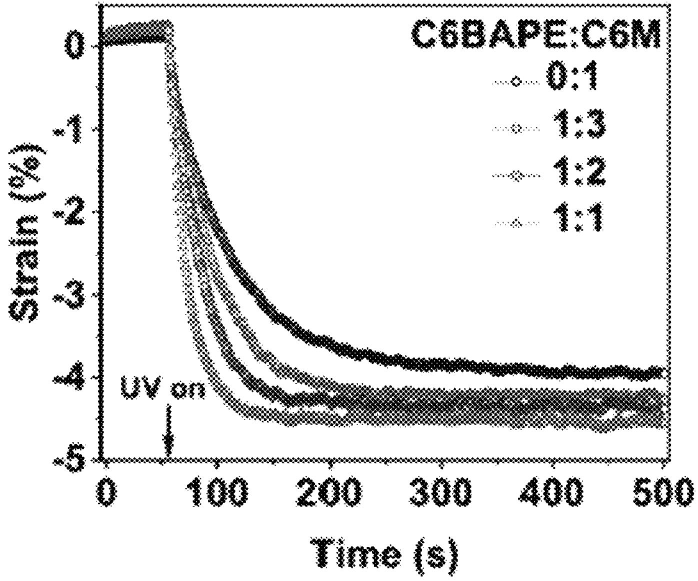
FIGS. 6A-6C are graphs summarizing experimental data regarding the photomechanical response of azo-LCE in accordance with various embodiments described herein.
Figure 6B:
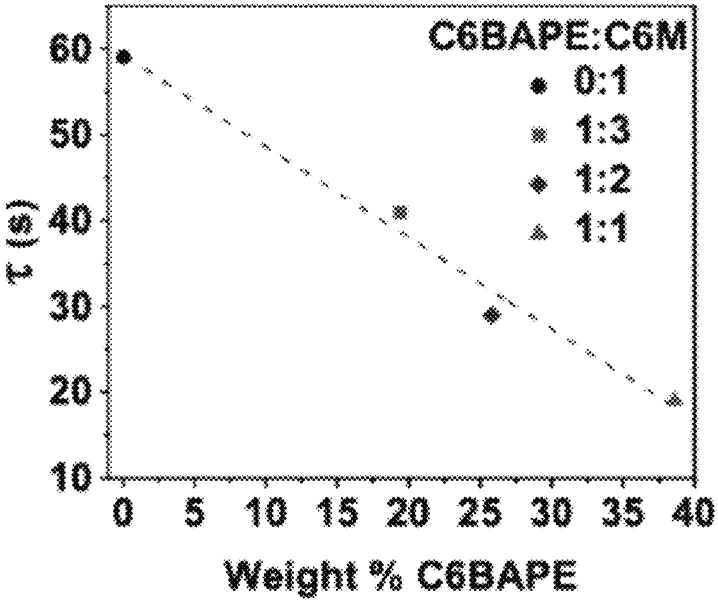

In an experiment analogous to thermomechanical characterization, azo-LCE samples composed of 0:1, 1:3, 1:2, and 1:1 C6BAPE:C6M were held in tension (0.001 N) and irradiated with UV light. FIG. 6A presents the photogenerated strain over time in these materials. Upon UV light exposure after equilibrating for 60 s, all four azo-LCE generated strain. The rate and magnitude of strain generation in the azo-LCE increased as C6BAPE concentration increased from 0-40 wt %. The photomechanical response curves in FIG. 6A were fit with an exponential to determine the time constant ($\tau$), which is plotted in FIG. 6B as a function of the C6BAPE concentration. Increasing the C6BAPE concentration from 0-40 wt % in the azo-LCE results in a nearly 40 s decrease in this value.

Figure 6C:
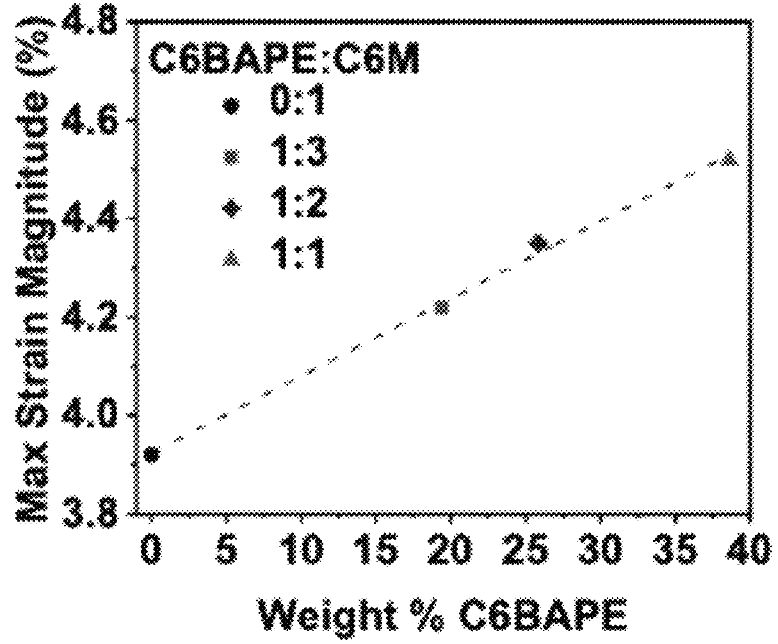

The contribution of C6BAPE to the magnitude of strain generation is summarized in FIG. 6C. Photogenerated strain is attributed largely to photochemical mechanisms rather than photothermal, as supported by thermographic imaging that confirms only a small increase in the sample temperature that remains well below the $T_{ni}$ of the materials upon exposure. Relatedly, it would be expected that performing the experiment at temperatures closer to the materials' $T_{ni}$ would result in further increase in photomechanically generated strain and decrease in time constant. These results affirm that reducing the strength of the mesogen-mesogen interactions within the azo-LCE results in a faster and larger magnitude of the phototropic response.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A liquid crystal elastomer, comprising:

a first liquid crystalline monomer having a first mesogenic core;

a second liquid crystalline monomer having a second mesogenic core;

a third liquid crystalline monomer having a third mesogenic core;

wherein the first mesogenic core, the second mesogenic core, and the third mesogenic core are all different; and wherein the first mesogenic core comprises 4-(6-(acryloyloxy)n-oxy)phenyl-4-(6-(acryloyloxy)m-oxy)benzoate, with n being any one of pentyl, hexyl, heptyl, octyl, nonyl, decyl, undecyl, and m being any one of pentyl, hexyl, heptyl, octyl, nonyl, decyl, undecyl.

2. The liquid crystal elastomer of claim 1, wherein n and m in 4-(6-(acryloyloxy)n-oxy)phenyl-4-(6-(acryloyloxy)m-oxy)benzoate are hexyl.

3. The liquid crystal elastomer of claim 1, wherein the second mesogenic core comprises more than two aromatic rings.

4. The liquid crystal elastomer of claim 1, wherein the second mesogenic core comprises 1,4-Bis[4-(n-acryloyloxybutyloxy)benzoyloxy]-2-methylbenzene.

5. The liquid crystal elastomer of claim 4, wherein the value of n in 1,4-Bis[4-(n-acryloyloxybutyloxy)benzoyloxy]-2-methylbenzene is from 3 to 11.

6. The liquid crystal elastomer of claim 4, wherein the molar ratio of 4-(6-(acryloyloxy)n-oxy)phenyl-4-(6-(acryloyloxy)m-oxy)benzoate to 1,4-Bis[4-(n-acryloyloxybutyloxy)benzoyloxy]-2-methylbenzene is about 1:1.

7. The liquid crystal elastomer of claim 1, wherein a thermotropic actuation temperature of the liquid crystal elastomer is less than 50° C.

8. The liquid crystal elastomer of claim 1, further comprising:

one or more thiol monomers.

9. The liquid crystal elastomer of claim 1, further comprising:

at least one first thiol monomer serving as a chain extender; and at least one second thiol monomer serving as a crosslinker.

10. The liquid crystal elastomer of claim 1, wherein the liquid crystal elastomer is one of surface aligned, mechanically aligned, or rheologically aligned.

11. The liquid crystal elastomer of claim 1, further comprising:

an azobenzene.

12. The liquid crystal elastomer of claim 11, wherein the second mesogenic core comprises 1,4-Bis[4-(n-acryloyloxybutyloxy)benzoyloxy]-2-methylbenzene, wherein the value of n in 1,4-Bis[4-(n-acryloyloxybutyloxy)benzoyloxy]-2-methylbenzene is from 3 to 11.

13. The liquid crystal elastomer of claim 12, wherein the value of n in 1,4-Bis[4-(n-acryloyloxybutyloxy)benzoyloxy]-2-methylbenzene is 6.

14. The liquid crystal elastomer of claim 12, wherein the weight ratio of 4-(6-(acryloyloxy)n-oxy)phenyl-4-(6-(acryloyloxy)m-oxy)benzoate to 1,4-Bis[4-(n-acryloyloxybutyloxy)benzoyloxy]-2-methylbenzene is from about 1:1 to about 1:3.

15. The liquid crystal elastomer of claim 11, wherein the liquid crystal elastomer is surface aligned.

* * * * *